United States Patent
Wong (10) Patent No.: US 8,629,938 B2
(45) Date of Patent: Jan. 14, 2014

(54) MULTI-POINT TELEVISION MOTION SENSOR SYSTEM AND METHOD

(75) Inventor: Ling Jun Wong, Escondido, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 752 days.

(21) Appl. No.: 12/573,729

(22) Filed: Oct. 5, 2009

(65) Prior Publication Data

US 2011/0080529 A1 Apr. 7, 2011

(51) Int. Cl.
*H04N 5/44* (2011.01)

(52) U.S. Cl.
USPC ........... 348/553; 348/563; 348/567; 348/730; 348/734; 348/818; 348/819; 348/158; 348/602; 340/686.6; 340/555; 340/552; 340/557; 340/540; 340/571; 345/158; 345/165

(58) Field of Classification Search
USPC ......... 348/553, 730, 734, 818, 819, 158, 451, 348/452, 562, 563, 567; 345/158, 165; 340/686.6, 555, 552, 557, 540, 571
See application file for complete search history.

(56) References Cited

U.S. PATENT DOCUMENTS

| | | | | |
|---|---|---|---|---|
| 5,541,664 A * | 7/1996 | Cuadrado | ...................... | 725/25 |
| 5,805,201 A * | 9/1998 | Fujiwara | ...................... | 348/818 |
| 6,201,569 B1 * | 3/2001 | Kawashima et al. | ......... | 348/190 |
| 6,259,486 B1 * | 7/2001 | Mahvi | ........................... | 348/553 |
| 6,671,004 B1 * | 12/2003 | Runtze et al. | ................. | 348/745 |
| 6,889,382 B1 * | 5/2005 | Anderson | ...................... | 725/10 |
| 6,927,696 B2 * | 8/2005 | Wasson Coley et al. | .. | 340/686.6 |
| 7,061,552 B1 * | 6/2006 | Patten et al. | .................. | 348/806 |
| 7,315,334 B2 * | 1/2008 | Donato | ......................... | 348/819 |
| 7,411,631 B1 * | 8/2008 | Joshi et al. | .................... | 348/734 |
| 7,456,908 B2 * | 11/2008 | Tai et al. | ....................... | 348/745 |
| 2003/0030757 A1 * | 2/2003 | Shim | ............................. | 348/745 |
| 2004/0051813 A1 * | 3/2004 | Marmaropoulos | ........... | 348/553 |
| 2006/0290921 A1 | 12/2006 | Hotelling et al. | | |
| 2008/0218493 A1 | 9/2008 | Pattern et al. | | |
| 2009/0089059 A1 * | 4/2009 | Ma et al. | ....................... | 704/254 |
| 2011/0063522 A1 * | 3/2011 | Karaoguz et al. | ............ | 348/734 |

FOREIGN PATENT DOCUMENTS

GB 2439763 A 9/2008

OTHER PUBLICATIONS

Franklin, Eric, "Now, LCD monitors watch you", Published on-line at CNET.com on Apr. 27, 2009—http://news.cnet.com/8301-17938_105-10227283-1.html?part=rss&subj=news&tag=2547-1_3-0-20.

* cited by examiner

*Primary Examiner* — Jefferey Harold
*Assistant Examiner* — Mustafizur Rahman
(74) *Attorney, Agent, or Firm* — John P. O'Banion (57) ABSTRACT

A system is disclosed for controlling operation of an electronic device, such as a TV. The system includes a first sensor located at or near the electronic device and a second sensor spaced apart from the first sensor, wherein the first and second sensors are configured to detect motion of a user within an operating zone associated with the electronic device. A processor is coupled to the electronic device and the first and second sensors, the processor being configured to input a signal from the first and second sensors. Memory is coupled to the processor, the memory comprising a sensing algorithm configured to process the input signal from the first and second sensors and determine the location of the user with respect to the operating zone. The processor is configured to send a control command to the electronic device based on an output of the sensing algorithm.

22 Claims, 5 Drawing Sheets

MULTI-POINT TELEVISION MOTION SENSOR SYSTEM AND METHOD

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to a motion sensor, and more particularly to a motion sensor for TV's or other large powered devices.

2. Description of Related Art

As the features of the TV get increasingly enriched, the prior and post user experience becomes instrumental in differentiating a TV from its competitors. One of such experience include the ability to sense the presence of a person, which includes detecting the person's arrival and departure, as well as avoiding misinterpretations. Once the TV knows about the presence of a person, various actions can be taken, like automatically turning on the TV, activating the TV's hibernating camera, dimming the lights. Similar things can be done when the person's departure is detected.

BRIEF SUMMARY OF THE INVENTION

The present invention is directed to a television of device coupled thereto, which are capable of sensing the presence of the user using multi point motion sensors and thereby automating the personalized settings and providing a complete TV viewing experience to the user. With the aid of motion sensors, the television can sense the presence and departure of a person and other aspects like location of the person, direction of the person, distance and also the intentions of the user.

The features of the televisions are being updated continuously and hence it is essential to equip the products with distinct features to distinguish it from the other products. One such idea is enabling the television to sense the presence of the user with the help of motion sensors and automating predefined settings such as brightness, stereo etc of the user. The arrangement provides the user a complete TV viewing experience.

The present invention detects the presence of user with the help of motion sensors in the television and also determines more accurately the distance, location and direction of the user. The invention also has a multipoint sensing algorithm to detect the intentions of the user to check whether the user stays back to watch the television and hence ignoring unwanted automation of the settings.

A multi-point sensing solution is described that detects the direction, distance, location and intention of the person for operation of an electronic device such as a TV. By achieving this, a set of automated settings can be activated to provide a complete TV viewing experience to the user.

The present invention includes a multi-point motion sensing solution that can more accurately detect the direction a person is heading, the location of the person, the distance of the person from the TV, and the intention of the person. With this information, automated settings can be easily realized to provide a more complete TV user experience.

An aspect of the present invention is a system for controlling operation of an electronic device, comprising: a first sensor located at or near the electronic device; a second sensor spaced apart from the first sensor; wherein the first and second sensors are configured to detect motion of a user within an operating zone associated with the electronic device; a processor coupled to the electronic device and the first and second sensors, the processor being configured to input a signal from the first and second sensors; and memory coupled to the processor, the memory comprising a sensing algorithm configured to process the input signal from the first and second sensors and determine the location of the user with respect to the operating zone; wherein the processor is configured to send a control command to the electronic device based on an output of the sensing algorithm.

In one embodiment, the electronic device comprises a TV, and the processor is configured to turn the TV on or off based on the output of the sensing algorithm. The TV may be coupled to one or more accessory devices, such that the processor is configured to turn the accessory devices on or off based on the output of the sensing algorithm. In another embodiment, the first sensor is located on a left side of the TV and the second sensor is located on the right side of the TV.

In yet another embodiment, the signal input from the first and second sensors varies according the proximity of the user to the first and second sensors. The sensing algorithm is configured to determine the location of the user with respect to the operating zone by comparing the input between the first and second sensors.

In a further embodiment, the memory further comprises a calibration algorithm, wherein the calibration algorithm is configured to calibrate the sensors to the location of the electronic device.

In another embodiment, the memory further comprises user preferences and wherein the sensing algorithm outputs as a function of the user preferences.

In one embodiment, the system is integrated with the electronic device.

Alternatively, the system is stand-alone with respect to the electronic device; and wherein the system is coupled to the electronic device via an input for the electronic device.

Another aspect is a method for controlling operation of an electronic device, comprising: locating a first sensor at or near the electronic device; locating a second sensor at or near the electronic device at a location spaced apart from the first sensor; wherein the first and second sensors are configured to detect motion of a user within an operating zone associated with the electronic device; receiving a signal from the first and second sensors, the signal corresponding to motion of the user within the operating zone; comparing the signal from the first sensor to the signal from the second sensor to determine a location of the user within the operating zone; and sending a control command to the electronic device based on the location of the user.

In one embodiment of the current aspect, the electronic device comprises a TV, and wherein sending a control command comprises turning the TV on or off based on the location of the user. The TV may be coupled to one or more accessory devices, such that sending a control command comprises turning the one or more accessories on or off based on the location of the user.

In another embodiment, sending a control command comprises turning the electronic device on based on the location of the user being within the operating zone for a predetermined period of time. The signal from the first sensor and the signal from the second sensor are compared over a period of time to determine direction of the user with respect to the operating zone. In a further embodiment, sending a control command comprises turning the electronic device off based on the user leaving the operating zone for a predetermined period of time.

Another aspect is a monitor, comprising: a first sensor located at or near a surface of the monitor; a second sensor spaced apart from the first sensor; wherein the first and second sensors are configured to detect motion of a user within an operating zone associated with the monitor; a processor coupled the first and second sensors, the processor being configured to input a signal from the first and second sensors; and memory coupled to the processor, the memory comprising a sensing algorithm configured to process the input signal from the first and second sensors and determine the location of the user with respect to the operating zone; wherein the processor is configured to send a control command to turn the monitor on or off based on an output of the sensing algorithm.

In one embodiment, the monitor is coupled to one or more accessory devices, and the processor is configured to turn the accessory devices on or off based on the output of the sensing algorithm. The signal input from the first and second sensors varies according the proximity of the user to the first and second sensors, and the sensing algorithm is configured to determine the location of the user with respect to the operating zone by comparing the input between the first and second sensors.

In one embodiment, the memory further comprises a calibration algorithm; wherein the calibration algorithm is configured to calibrate the sensors to the location of the monitor.

In another embodiment, the memory further comprises user preferences, wherein the sensing algorithm generates the output as a function of the user preferences. In yet another embodiment, the user preferences designate the location of the operating zone.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 7. It will be appreciated that the apparatus may vary as to configuration and as to details of the parts, and that the method may vary as to the specific steps and sequence, without departing from the basic concepts as disclosed herein.

By using two motion sensors on both ends of the TV or other electronic component, it is possible to get the direction of a user, the location of the user, the distance of the user from the TV, and the intention of the user. With this information, it is possible to automatically control the TV and/or accessory devices coupled to it based on the user's actions.

The multi-point motion sensor system and algorithm of the present invention is used to more accurately determine the intentions of the user, rather than a falsified intention which may end up bringing more trouble than convenience to the user.

Figure 1:
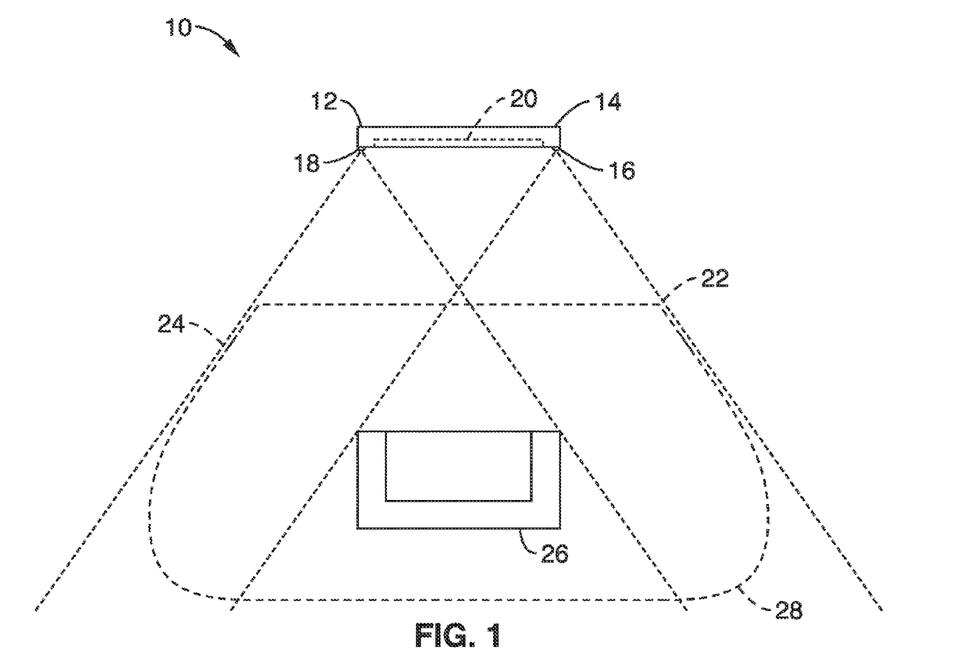
FIG. 1 is a top view of a sensing system in accordance with the present invention.

FIG. 1 illustrates sensing system 10 of the present invention with a monitor or TV 12 having a left motion sensor 18 and right motion sensor 16 positioned on each end of the TV 12 and pointed slightly outwards. The left motion sensor 18 and right motion sensor 16 may also be located at a location near the TV 12, and be coupled to the TV 12 or controlling device via a wired or wireless connection. For purposes of the present invention, right can be easily interchanged with left, however for purposes of clarity, "right" corresponds to the right side of the TV 12 and "left" corresponds to the left side of the TV 12 from a viewer's perspective. Additionally, it is appreciated that the terms "monitor" and "TV" may be used interchangeably, as the system and methods of the present invention may be equally advantageous for both. For purposes of this description, "monitor" shall be construed broadly to include both a TV and a display not having a tuner.

As shown in FIG. 1, TV 12 includes a display 20 disposed within housing 14. The housing 14 may further house sensors 16 and 18 (e.g. the sensors being inset or encased in the housing 14). In such case, the sensors 16, 18 may be integrated into the controls of the TV 12. Alternatively, as will be explained in greater detail below, the sensors 16,18 may comprise add-on attachments that that are also integrated with the TV controls via a wireless connection, or may comprise part of a stand-alone system that is capable of integrating with the TV 12 independent of whether the TV 12 was designed or configured for the sensor technology of the present invention. The sensing system 10 may be also be integrated into a different component (e.g. set top box, amplifier, or separate control box altogether).

FIG. 1 illustrates the range boundaries of the sensors 16 and 18, depicted as dashed lines 22 and 24 respectively. The range boundaries 22 and 24 denote a volume in space (generally conical) wherein the sensors 16 and 18 detect at least some indication of motion (however minute that presence is). As a user travels from the boundary inward and toward the apex of the range boundary, the signal detected by the sensors may grow stronger and intensify. FIG. 1 also depicts a viewing or operation zone 28. This zone 28 may be preset, or calibrated by the user, and is used to determine the intentions of the user for device control (e.g. remaining stationary within the zone is an indication that the device is to turn or remain on).

Figure 2:
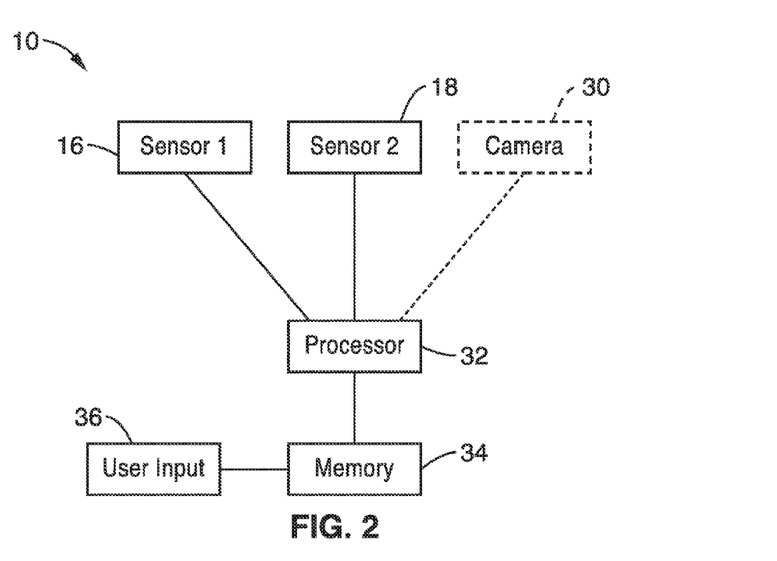
FIG. 2 is a schematic view of a sensing system in accordance with the present invention.

FIG. 2 illustrates a schematic diagram of sensor system 10 in accordance with the present invention. System 10 generally includes left and right sensors 16 and 18, and a processor 32 for receiving input from the sensors (and user input 36) and applying a sensing algorithm 54 stored in memory 34 to perform some operation on the TV 12 based on an output of the sensing algorithm 54. System 10 may also include a user input module 52 that allows for a user to apply preferences/calibrate, or otherwise dictate desired operating characteristics of the system.

Optionally, a camera 30 may also be provided to provide additional input for the system 10. The use of a camera 30, by itself, may by used to determine the location and actions of a user, but the limitations include higher hardware costs, constant and greater processing power, higher consumption of energy during sleep mode, and a more limited field of view. Therefore such use a camera is not preferred to achieve such purposes. However, the camera 30 may optionally be used where personal identification is needed. In such case, the motion sensors 16, 18 can be used to wake up the camera 30 at the right time, and then the camera would perform the necessary personal identification of the user (e.g. via a face recognition software) to trigger personalized TV and environment settings.

Figure 3:
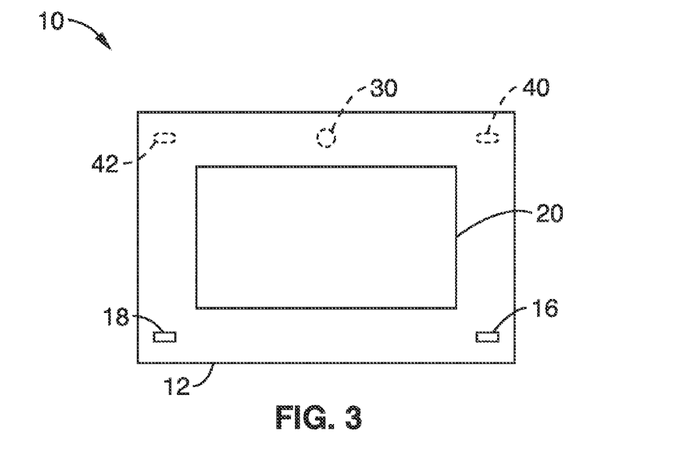
FIG. 3 is a front view of the sensing system of FIG. 1.

A shown in the front view of TV 12 depicted in FIG. 3, system 10 may optionally include one or more additional sensors 42, 40 to provide additional sensing in a different plane (e.g. a plane parallel to the screen 20). This could be used for additional capabilities in determining that the user is getting up or sitting down at a particular location.

Figure 4:
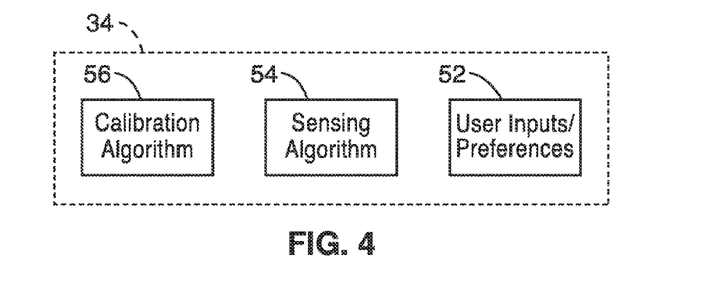
FIG. 4 illustrates allocated memory for the sensing system of FIG. 1.

FIG. 4 illustrates memory 34, having various software application modules allocated. For example, memory may comprise a calibration algorithm for calibrating the sensors to the layout of a particular room and viewing locations e.g. couch 26. Memory further comprises allocation for a sensing algorithm 54 for evaluating input from the sensors and determining a control operation of the TV 12 based on preset parameters, calibrated parameters (e.g. from calibration algorithm 56), and or user inputs/preferences also stored on memory 34. Calibration algorithm 56 may be used to calibrate boundaries, e.g. operating zone 28, and/or sensitivity of the sensors 16, 18 to fit the user's preferences.

Figure 5:
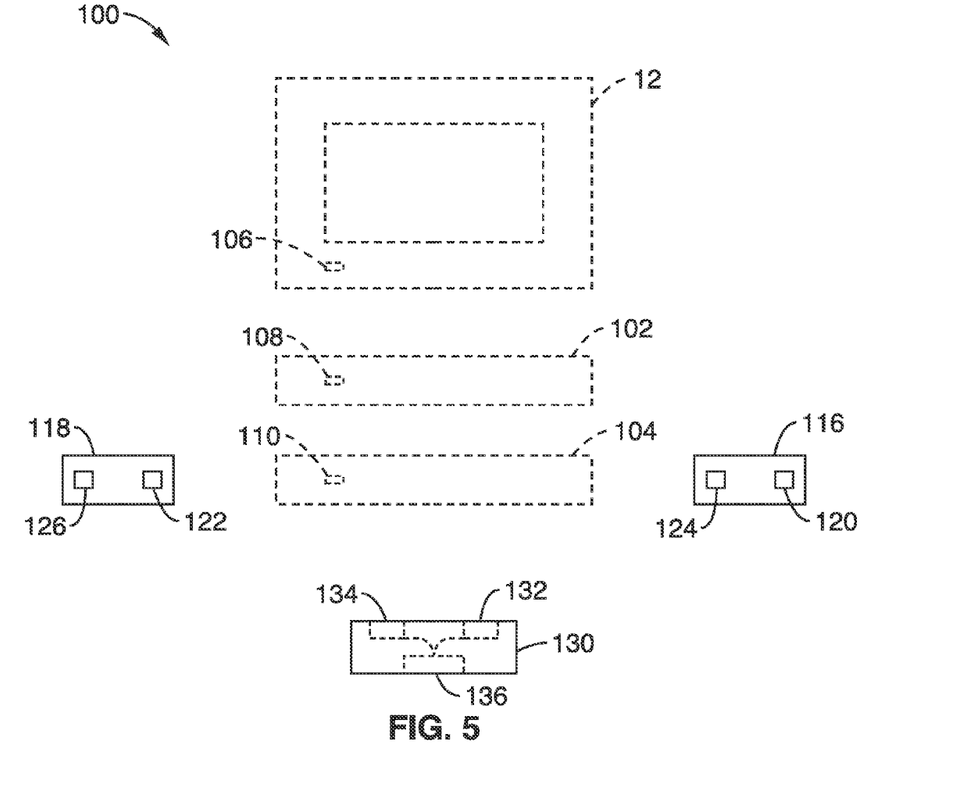
FIG. 5 illustrates a front view of a stand-alone sensing system 100 in accordance with the present invention.

As explained above, the system 10 may be integrated, or stand-alone with respect to an electronic device or TV 12. FIG. 5 illustrates an alternative embodiment wherein a stand-alone system 100 is used to control operation of one or more devices.

System 100 includes a right motion sensor component 116 and left motion sensor component 118 that may either be attached to, or placed near TV 12. Right motion sensor component 116 and left motion sensor component 118, have respective motion sensors 120 and 126. The system 100 also includes a control box 130 having a processor 136 for effecting control of one or more components (e.g. TV 12, set top box 104, amplifier 102, etc.) via a wireless transmitter 134 (e.g. IR transmitter) that is configured to interface with wireless inputs 106, 108, and 110 that are typically used for the remote control of each device. The right motion sensor component 116 and left motion sensor component 118 may communicate with the control box 130 via a wired connection (not shown) or wireless transmitters 122 and 124 that are configured to send a signal to be received by input sensor 132 on the control box 130. The control box receives the signals from the sensors 120 and 126, and can compare the signals to determine the location and or direction of a user within the operation zone 28 via a sensing algorithm 54 (located in memory on the control box 130). The control operation may be used to send a control command to one or all three components 12, 102, or 104 via transmitter 134. The control command may be the same for each component, e.g. "power on," or may be specific to each device, e.g. "volume to 30 dB," "select channel 11," etc. These specific commands may also be saved in the user preferences 52.

Figure 6:
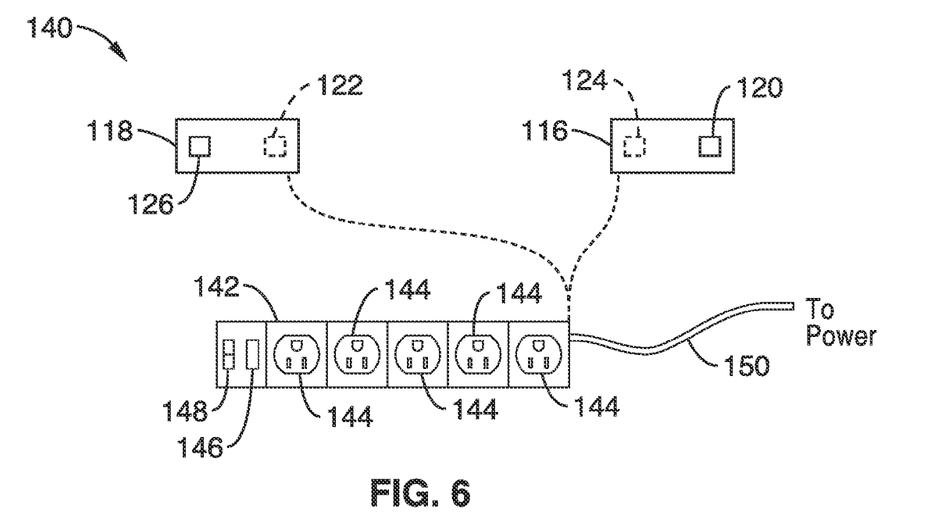
FIG. 6 illustrates a schematic view of an alternative stand-alone sensing system 140 in accordance with the present invention.

FIG. 6 illustrates another alternative system 140 wherein the right motion sensor component 116 and left motion sensor component 118 may communicate via a control box 142 that comprises one or more power receptacles 144 that may power (via power source 150) one or more components. Right motion sensor component 116 and left motion sensor component 118, have respective motion sensors 120 and 126. The right motion sensor component 116 and left motion sensor component 118 may communicate with the control box 142 via a wired connection (dashed) or optional wireless transmitters 122 and 124 that are configured to send a signal to be received by input sensor 146 on the control box 142. Processor 148 may then compare the signals, and turn power on or off to each receptacle individually or in unison.

Figure 7:
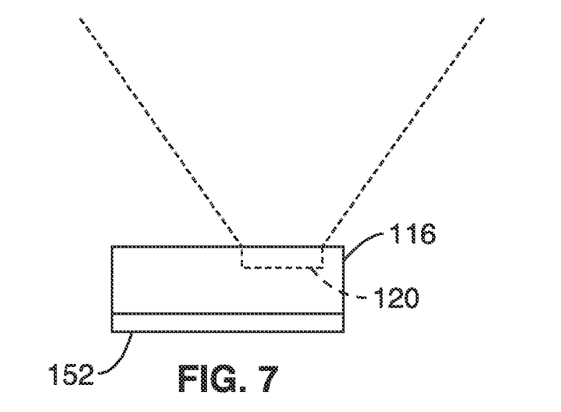
FIG. 7 illustrates a sensor in accordance with the present invention.

FIG. 7 illustrates a side or top view of right sensor component 116 configured to mount to a TV or other surface. The sensor component 116 may comprise a double-sided adhesive 152 that sticks to the desired mounting surface.

Figure 8:
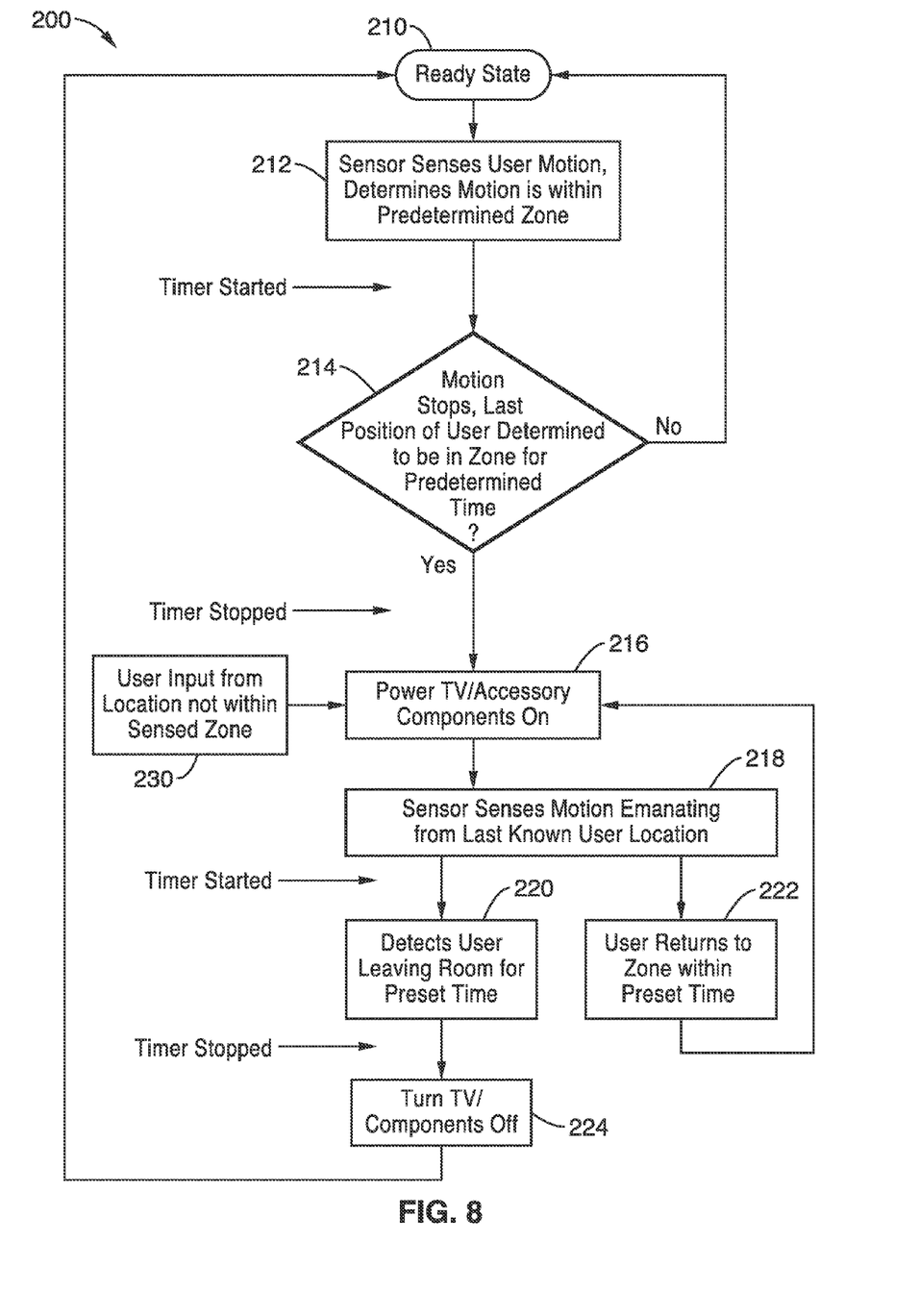
FIG. 8 illustrates a flow diagram for a sensing algorithm in accordance with the present invention.

FIG. 8 illustrates a flow diagram for a sensing algorithm 200 in accordance with the present invention. The following use cases are used to demonstrate how the sensing algorithm 200 is used to determine the intentions of the user to control one or more electronic devices.

Use Case 1: (Typical Case)

The system (10, 100, 140) is generally in a powered, ready state 210 with the sensors positioned properly with relation to the operating zone 28 (see FIG. 1). In this case the user comes in from the right side of the room and sits down on couch 26, which could be on the left, center or right side of the TV (shown directly in center in FIG. 1). The user watches the TV for a while and then leaves from the left side.

In the first step 212 the right sensor detects the approaching person within the operating zone 28, with increasing intensity of vibration as the user enters the range boundary 22 of sensor 16 and proceeds toward the couch. As shown in FIG. 1, the couch is positioned within the range boundary of 24 of the left sensor 18, thus the left sensor will start to sense increasing vibrations of corresponding magnitude. If the couch was on the right, the left sensor receives minimal vibration to no vibration. One a sensor senses movement within zone 28, a timer is started. When the user sits down for a certain predetermined duration, e.g. 5 seconds, or whatever time specified in the user's preferences, both sensors receive none, or minimal vibrations.

Once the 5 sec is over at step 214, the last position of the user, which has not changed, is still within the zone, indicating the user's intention and is waiting for the TV 12 (or other devices) to power up. At this time, a signal is sent to the TV 12 to power up at step 216. A set of additional automated settings can also be done in step 216, such as dimming of lights, turning on amplifier/stereo speakers, etc. 5)

The user watches the TV 12 for a certain time and leaves from the right side of the room, the motion of which is sensed at step 218. The left sensor 18 detects some motion strongly and then weakly. This wave is passed to the right sensor 16, which detects it in a similar manner. This marks a departure at step 220. At this point, another countdown timer is set, e.g. for 15 min. When the timer fires off, a set of power down automation is triggered at step 224, and such could be powering down of the TV, brightening of lights, etc. If the user returns before the 15 min as shown in step 222, (the sensors receive strong vibrations within the stipulated time), the timer is switched off, and the state returns to TV power on state.

Use Case 2: (Falsified Case)

In this case, the user comes in from the right side, and picks up something near the couch 26 and leaves from the right side. First, the right sensor 16 goes from minimal to strong vibrations indicating user is in zone 28 at step 212. As the user passes the right sensor 16, the left sensor 18 receives vibrations from minimal to medium. This means that there is a user in front of the TV 12. At this point the startup timer is started. The user then leaves before the stipulated time. The left sensor 18 goes from medium vibrations to minimal vibrations. The right sensor 16 goes from maximum vibrations to minimal. This denotes a departure (last position of user not in zone) at stop of timer. The startup timer is switched off, and the system goes back to ready state 210.

Use Case 3: (Falsified Case)

In this case, the user comes in from the right side, does something in front of the TV, and leaves after a while. First, the right sensor 16 goes from minimal to strong vibrations indicating user is in zone 28 at step 212. As the user passes the right sensor 16, the left sensor 18 receives vibrations from minimal to medium. This means that there is a user in front of the TV 12. At this point the startup timer is started. The user stays beyond the stipulated time, thus registering the last known location of the user within zone 28 at step 214. The system commands the TV 12 to power up at step 216. 5) The user then leaves from the right side of the room, the motion of which is sensed at step 218. The left sensor 18 detects some motion strongly and then weakly. This wave is passed to the right sensor 16, which detects it in a similar manner. This marks a departure at step 220. At this point, another countdown timer is set, e.g. for 15 min. When the timer fires off, a set of power down automation is triggered at step 224.

Use Case 4: (Falsified Case)

In this case, the user stays at a distance from the TV, doing something else. Both the sensors receive some vibrations, but the vibrations not within a certain threshold to be considered a valid presence in zone 28. The system remains in ready state 210, and the TV 12 remains switched off with no startup timer activated.

Use Case 5: (True Use Case)

In this case, the user stays at a distance from the TV, say a dining table outside zone 28. The user turns on the TV with the remote, and leaves the dining table after a while. While the user is at the table, both the sensors receive some vibrations, but the vibrations are not within a certain threshold to be considered a valid presence in zone 28. The system stays in ready mode 210 and the TV remains switched off with no startup timer activated. However, the user turns the TV on with the remote at 230. This changes the TV state from sleep to ON at step 216. The user then leaves the dining table after a while, and the vibrations on the sensors go from low to minimal at step 218. This denotes a departure at step 220 and the timer is started. The shutdown procedure is activated if the sensors do not receive similarly low vibrations within the stipulated time of 15 min. If such vibrations are received within the stipulated time (step 222), the shutdown timer is turned off. However, the vibrations of that level have to last for at least a certain amount of time, say 3 min, because of its low intensity, in order to be assured that the vibrations are not just random environment noise. If such vibrations are not maintained, the shutdown timer is once again activated for 15 min.

It is also appreciated that the invention is not limited to only a single user context. This invention should be applicable to a multi-user context whereby a counter within the program code will monitor the number of people within its detection zone. The startup procedure is triggered when the first person enters the detection zone (vibrations detected when there is none previously), while the shutdown procedure is only activated when the last person leaves the detection zone (minimal vibrations detected when there is positive vibration detection previously).

While the above embodiments are directed to the use for TV and associated components, it is appreciated that the multi-point motion identification system of the present invention can be used in other large and stationery devices as well, such as a PC desktop, piano, stereo, or like devices.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

As can be seen, therefore, the present invention includes the following inventive embodiments among others:

1. A system for controlling operation of an electronic device, comprising: a first sensor located at or near the electronic device; a second sensor spaced apart from the first sensor; wherein the first and second sensors are configured to detect motion of a user within an operating zone associated with the electronic device; a processor coupled to the electronic device and the first and second sensors, the processor being configured to input a signal from the first and second sensors; and memory coupled to the processor, the memory comprising a sensing algorithm configured to process the input signal from the first and second sensors and determine the location of the user with respect to the operating zone; wherein the processor is configured to send a control command to the electronic device based on an output of the sensing algorithm.

2. A system as recited in embodiment 1: wherein the electronic device comprises a TV; and wherein the processor is configured to turn the TV on or off based on the output of the sensing algorithm.

3. A system as recited in embodiment 2: wherein the TV is coupled to one or more accessory devices; and wherein the processor is configured to turn the accessory devices on or off based on the output of the sensing algorithm.

4. A system as recited in embodiment 3: wherein the first sensor is located on a left side of the TV and the second sensor is located on the right side of the TV.

5. A system as recited in embodiment 1: wherein the signal input from the first and second sensors varies according the proximity of the user to the first and second sensors; and wherein the sensing algorithm is configured to determine the location of the user with respect to the operating zone by comparing the input between the first and second sensors.

6. A system as recited in embodiment 1: wherein the memory further comprises a calibration algorithm; wherein the calibration algorithm is configured to calibrate the sensors to the location of the electronic device.

7. A system as recited in embodiment 1: wherein the memory further comprises user preferences; wherein the sensing algorithm outputs as a function of the user preferences.

8. A system as recited in embodiment 1, wherein the system is integrated with the electronic device.

9. A system as recited in embodiment 1: wherein the system is stand-alone with respect to the electronic device; and wherein the system is coupled to the electronic device via an input for the electronic device.

10. A method for controlling operation of an electronic device, comprising: locating a first sensor at or near the electronic device; locating a second sensor at or near the electronic device at a location spaced apart from the first sensor; wherein the first and second sensors are configured to detect motion of a user within an operating zone associated with the electronic device; receiving a signal from the first and second sensors, the signal corresponding to motion of the user within the operating zone; comparing the signal from the first sensor to the signal from the second sensor to determine a location of the user within the operating zone sending a control command to the electronic device based on the location of the user.

11. A method as recited in embodiment 10: wherein the electronic device comprises a TV; and wherein sending a control command comprises turning the TV on or off based on the location of the user.

12. A method as recited in embodiment 11: wherein the TV is coupled to one or more accessory devices; and wherein sending a control command comprises turning the one or more accessories on or off based on the location of the user.

13. A method as recited in embodiment 1: wherein sending a control command comprises turning the electronic device on based on the location of the user being within the operating zone for a predetermined period of time.

14. A method as recited in embodiment 13: wherein the signal from the first sensor and the signal from the second sensor are compared over a period of time to determine direction of the user with respect to the operating zone.

15. A method as recited in embodiment 14, wherein sending a control command comprises turning the electronic device off based on the user leaving the operating zone for a predetermined period of time.

16. A monitor, comprising: a first sensor located at or near a surface of the monitor; a second sensor spaced apart from the first sensor; wherein the first and second sensors are configured to detect motion of a user within an operating zone associated with the monitor; a processor coupled the first and second sensors, the processor being configured to input a signal from the first and second sensors; and memory coupled to the processor, the memory comprising a sensing algorithm configured to process the input signal from the first and second sensors and determine the location of the user with respect to the operating zone; wherein the processor is configured to send a control command to turn the monitor on or off based on an output of the sensing algorithm.

17. A monitor as recited in embodiment 16: wherein the monitor is coupled to one or more accessory devices; and wherein the processor is configured to turn the accessory devices on or off based on the output of the sensing algorithm.

18. A monitor as recited in embodiment 16: wherein the signal input from the first and second sensors varies according the proximity of the user to the first and second sensors; and wherein the sensing algorithm is configured to determine the location of the user with respect to the operating zone by comparing the input between the first and second sensors.

19. A monitor as recited in embodiment 16: wherein the memory further comprises a calibration algorithm; wherein the calibration algorithm is configured to calibrate the sensors to the location of the monitor.

20. A monitor as recited in embodiment 16: wherein the memory further comprises user preferences; wherein the sensing algorithm the output as a function of the user preferences.

21. A monitor as recited in embodiment 20: wherein the user preferences designate the location of the operating zone.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for controlling operation of an electronic device, comprising:
a first sensor located at or near the electronic device;
a second sensor spaced apart from the first sensor;
wherein the first and second sensors are configured to detect motion of a user within an operating zone associated with the electronic device;
a processor coupled to the electronic device and the first and second sensors, the processor being configured to input a signal from the first and second sensors; and
memory coupled to the processor, the memory comprising a sensing algorithm executable by the processor to process the input signal from the first and second sensors and determine the location of the user with respect to the operating zone;
wherein the processor is configured to send a control command to the electronic device based on an output of the sensing algorithm;
wherein the control command is configured to turn the electronic device off based on an output of the sensing algorithm indicating that the user has departed the operating zone.

2. The system as recited in claim 1:
wherein the electronic device comprises a TV; and
wherein the control command is configured to turn the TV on based on the output of the sensing algorithm indicating that the user has entered the operating zone.

3. The system as recited in claim 2:
wherein the TV is coupled to one or more accessory devices; and
wherein the processor is configured to turn the accessory devices on or off based on the output of the sensing algorithm.

4. The system as recited in claim 3:
wherein the first sensor is located on a left side of the TV and the second sensor is located on the right side of the TV.

5. The system as recited in claim 1:
wherein the signal input from the first and second sensors varies according the proximity of the user to the first and second sensors; and
wherein the sensing algorithm is configured to determine the location of the user with respect to the operating zone by comparing the input between the first and second sensors.

6. The system as recited in claim 1:
wherein the memory further comprises a calibration algorithm;
wherein the calibration algorithm is configured to calibrate the sensors to the location of the electronic device.

7. The system as recited in claim 1:
wherein the memory further comprises user preferences;
wherein the sensing algorithm outputs as a function of the user preferences.

8. The system as recited in claim 1, wherein the system is integrated with the electronic device.

9. The system as recited in claim 1:
wherein the system is stand-alone with respect to the electronic device; and
wherein the system is coupled to the electronic device via an input for the electronic device.

10. A method for controlling operation of an electronic device, comprising:
locating a first sensor at or near the electronic device;
locating a second sensor at or near the electronic device at a location spaced apart from the first sensor;
wherein the first and second sensors are configured to detect motion of a user within an operating zone associated with the electronic device;
receiving a signal from the first and second sensors, the signal corresponding to motion of the user within the operating zone;
comparing the signal from the first sensor to the signal from the second sensor to determine a location of the user within the operating zone; and
sending a control command to the electronic device based on the location of the user;
wherein the control command is configured to turn the electronic device off based on an output of the sensing algorithm indicating that the user has departed the operating zone.

11. The method as recited in claim 10:
wherein the electronic device comprises a TV; and
wherein sending a control command comprises turning the TV on based on the output of the sensing algorithm indicating that the user has entered the operating zone.

12. The method as recited in claim 11:
wherein the TV is coupled to one or more accessory devices; and
wherein sending a control command comprises turning the one or more accessories on or off based on the location of the user.

13. The method as recited in claim 12:
wherein sending a control command comprises turning the electronic device on based on the location of the user being within the operating zone for a predetermined period of time.

14. The method as recited in claim 13:
wherein the signal from the first sensor and the signal from the second sensor are compared over a period of time to determine direction of the user with respect to the operating zone.

15. The method as recited in claim 14, wherein sending a control command comprises turning the electronic device off based on the user leaving the operating zone for a predetermined period of time.

16. A monitor, comprising:
a first sensor located at or near a surface of the monitor;
a second sensor spaced apart from the first sensor;
wherein the first and second sensors are configured to detect motion of a user within an operating zone associated with the monitor;
a processor coupled the first and second sensors, the processor being configured to input a signal from the first and second sensors; and
memory coupled to the processor, the memory comprising a sensing algorithm executable by the processor to process the input signal from the first and second sensors and determine the location of the user with respect to the operating zone;

wherein the processor is configured to send a control command to turn the monitor off based on an output of the sensing algorithm indicating that the user has departed the operating zone.

17. The monitor as recited in claim 16:
wherein the monitor is coupled to one or more accessory devices; and
wherein the processor is configured to turn the accessory devices on or off based on the output of the sensing algorithm.

18. The monitor as recited in claim 16:
wherein the signal input from the first and second sensors varies according the proximity of the user to the first and second sensors; and
wherein the sensing algorithm is configured to determine the location of the user with respect to the operating zone by comparing the input between the first and second sensors.

19. The monitor as recited in claim 16:
wherein the memory further comprises a calibration algorithm;
wherein the calibration algorithm is configured to calibrate the sensors to the location of the monitor.

20. The monitor as recited in claim 16:
wherein the memory further comprises user preferences;
wherein the sensing algorithm generates the output as a function of the user preferences.

21. The monitor as recited in claim 20:
wherein the user preferences designate the location of the operating zone.

22. The monitor as recited in claim 16, wherein sending a control command comprises turning the monitor on based on the output of the sensing algorithm indicating that the user has entered the operating zone.

* * * * *